May 3, 1966 R. H. MONROE 3,248,949
COMMODITY SAMPLING APPARATUS FOR A CONVEYOR
Filed Aug. 21, 1963 4 Sheets-Sheet 3

INVENTOR.
RAYMOND H. MONROE
BY
*John H. Widdowson*
ATTORNEY

May 3, 1966  R. H. MONROE  3,248,949
COMMODITY SAMPLING APPARATUS FOR A CONVEYOR
Filed Aug. 21, 1963  4 Sheets-Sheet 4
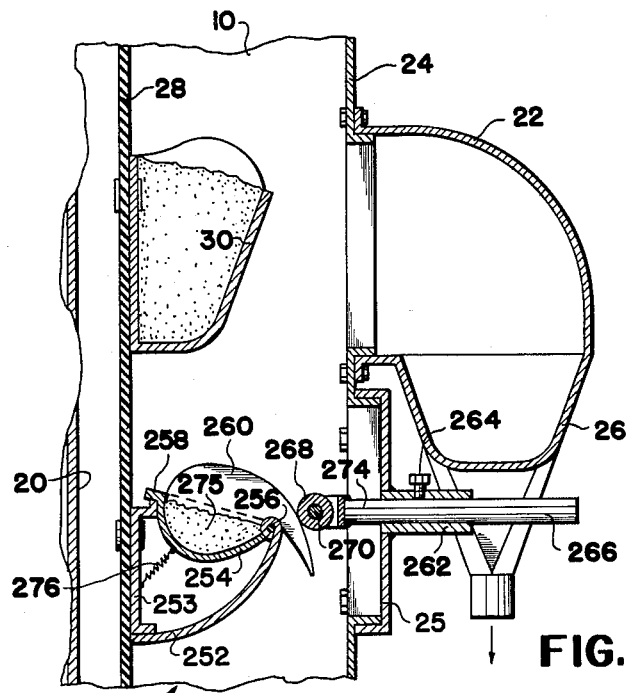
FIG. 6
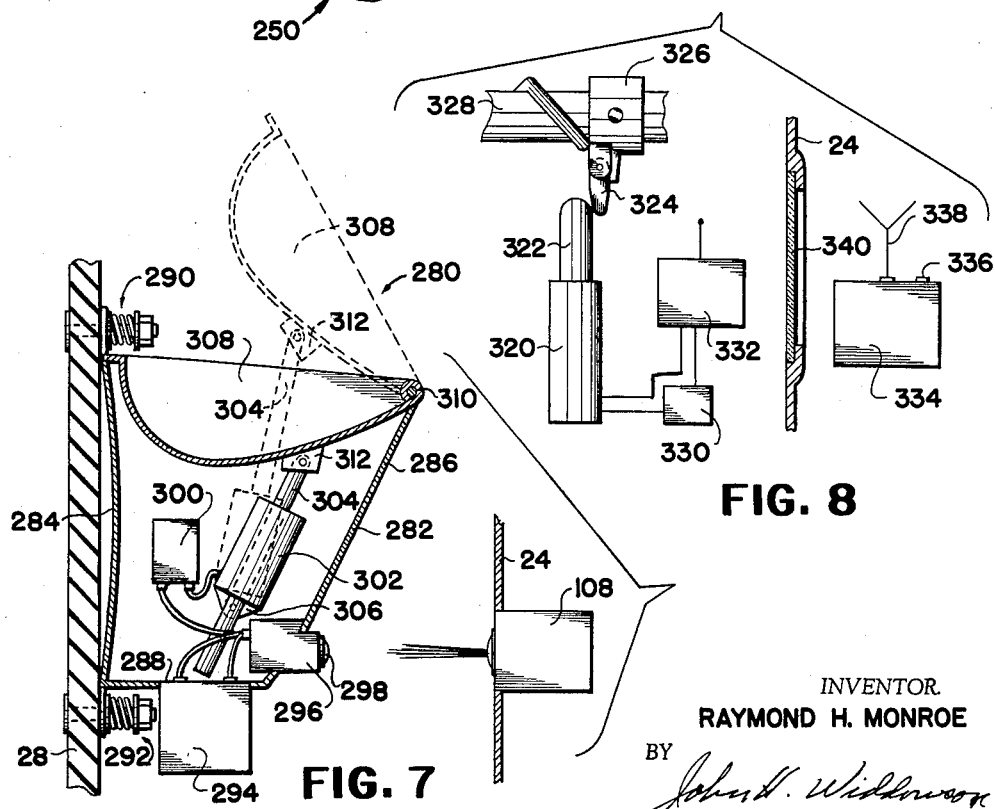
FIG. 7
FIG. 8
INVENTOR.
RAYMOND H. MONROE
BY
John H. Wilkinson
ATTORNEY United States Patent Office 3,248,949
Patented May 3, 1966

3,248,949
COMMODITY SAMPLING APPARATUS FOR
A CONVEYOR
Raymond H. Monroe, Hutchinson, Kans.
(4569 S. Handley, Wichita, Kans.)
Filed Aug. 21, 1963, Ser. No. 303,623
6 Claims. (Cl. 73—421)

This invention relates to means for sampling means for grain or other material and, in a more specific aspect, the invention relates to means for use with a conveyor or the like whereby a sample of material being moved by the conveyor can be taken periodically. In a still more specific aspect the invention relates to sampling means for use with a conveying system wherein the material receiving portion of the apparatus passes through the boot portion of the conveyor system to receive material therein and is periodically actuated to provide a sample of material for inspection or other uses.

Various attempts have been made to provide satisfactory sampling apparatus for coal or other materials and includes devices wherein entirely separate conveying apparatus are utilized for the sample taking operations and such is undesirable since it is expensive, requires space not normally available in the conveying apparatus for moving the commodity in question. Other means have been provided to trip conveying apparatus, such as buckets or the like mounted on belts so that the conveyor can be uitilized to convey materials to various levels or floors in a building or the like, however such does not provide suitable means for taking samples but merely serves as a means for conveying the entire load in the bucket or conveyor system to a specific level or location.

In accordance with the present invention new means for sampling materials, particularly conveyor moved materials or the like, have been provided which overcome many of the disadvantages of the prior art devices. The means for sampling materials of the invention includes support means and means for receiving conveyor moved material movably mounted by the support means. Means are operatively connected to the means to receive material to move same relative to the support means for discharge of material therein. Actuating means are associated with the means operatively connected to the means to receive material to cause operation thereof and movement of the means to receive material so that a sample of the material can be taken.

Accordingly, it is an object of the invention to provide new means for sampling materials, particularly conveyor moved materials.

Another object of the invention is to provide means for sampling materials or the like which are connectible to conveyor structures and movable therewith without substantial modification of the conveying structure.

Another object of the invention is to provide new sampler means for conveyor moved materials or the like in which a sample of the material is taken during each complete cycle of operation of the associated conveyor means.

Another object of the invention is to provide new sampler means for conveyor moved materials or the like wherein a sample can be taken only periodically as a result of remotely mounted or positioned control means.

A still further object of the invention is to provide new means for sampling conveyor moved materials or the like wherein actuating means control movement of a sample receiving portion of the device to discharge the material into a sample receiving portion of the device and wherein means are provided to automatically return the material receiving portion of the device to a position to receive another material sample during a subsequent cycle of operation from the apparatus.

Another object of the invention is to provide new and noval means for controlling movement of a sample cup or the like in a grain sampling apparatus.

Various other objects, advantages and features of the invention will become apparent to those skilled in the art from the following description taken in connection with the accompanying drawings, in which.

Figure 1:
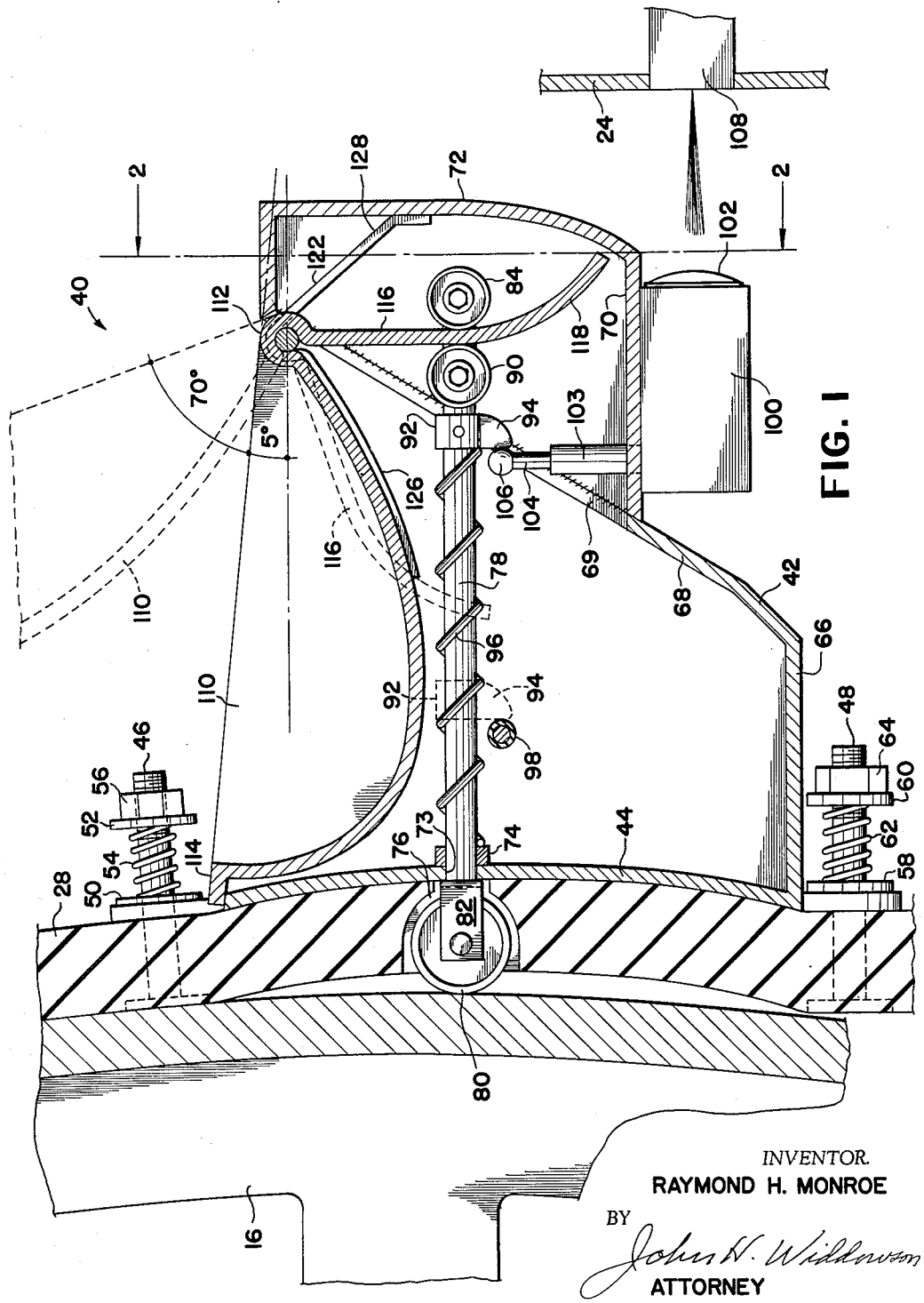
FIG. 1 is a partial cross section view taken along the line 1—1 of FIG. 2 showing a preferred specific embodiment of a material sampling means of the invention.

FIG. 6 of the drawings is a partial cross section view through a conveyor structure illustrating another preferred specific embodiment of the sampler means of the invention.

FIG. 7 of the drawings is a partial cross section view illustrating another preferred specific embodiment of the sampling means of the invention.

FIG. 8 is a view, partially in cross section and partially diagrammatically illustrating another preferred means for actuating the sampling means of the invention.

The following is a discussion and description of preferred specific embodiments of the new sampling means of the invention, such being made with reference to the drawings whereon the same reference numerals are used to indicate the same or similar parts and/or structure. It is to be understood that such discussion and description is not to unduly limit the scope of the invention.

Figure 3:
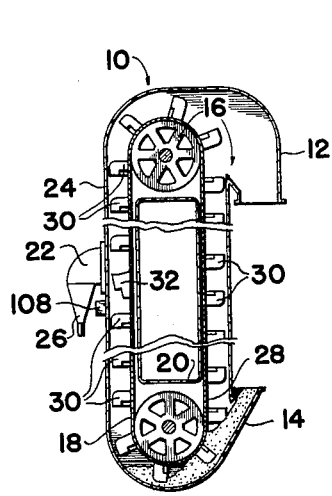
FIG. 3 is a cross section view on a smaller scale through a conveyor apparatus with means for sampling conveyor moved materials or the like positioned thereon.

Referring now to the drawings in detail and to FIG. 3 in particular, a conveyor housing is shown generally at 10 and preferably has an outlet 12 at an upper portion thereof and an inlet 14 at a lower portion thereof to receive grain, material in granular form, or other suitable materials to be moved by a conveyor or the like. A head roller 16 can be rotatably mounted on the upper portion of the housing 10 and a boot roller 18 can be rotatably positioned in the lower portion of the housing 10 and an inner housing 20 can be provided and positioned between the head roller 16 and boot roller 18 and between the outer walls of the housing 10.

Preferably, a sample chute 22 is provided and is connected to a side 24 of the conveyor housing 10 and an upper portion of sample chute 22 opens into the housing 10. The lower portion 26 of the sample chute 22 is preferably generally funnel shaped and has an opening in the bottom thereof to discharge a sample of grain or the like therefrom.

An endless belt, chain or the like 28 extends between and is positioned on the head roller 16 and the boot roller 18 and is movable therearound in operation. A plurality of buckets or the like 30 of any suitable construction are provided and are mounted on the belt 28 to be movable therewith and the buckets 30 normally have a side portion thereof which is connected to the belt with the bottom portion projecting outwardly substantially perpendicular to the belt and with the buckets being moved during movement of the belt from the boot portion of the housing upwardly around the head roller and returned to the boot portion of the housing to thereby receive and move grain or the like or other suitable materials positioned in the boot portion of the housing. Mounted between two adjacent ones of the buckets 30 is the sampling means of the invention and such has been designated generally at 32 in FIG. 3 to show the relation between the sampling means of the invention and the conveyor structure.

Figure 2:
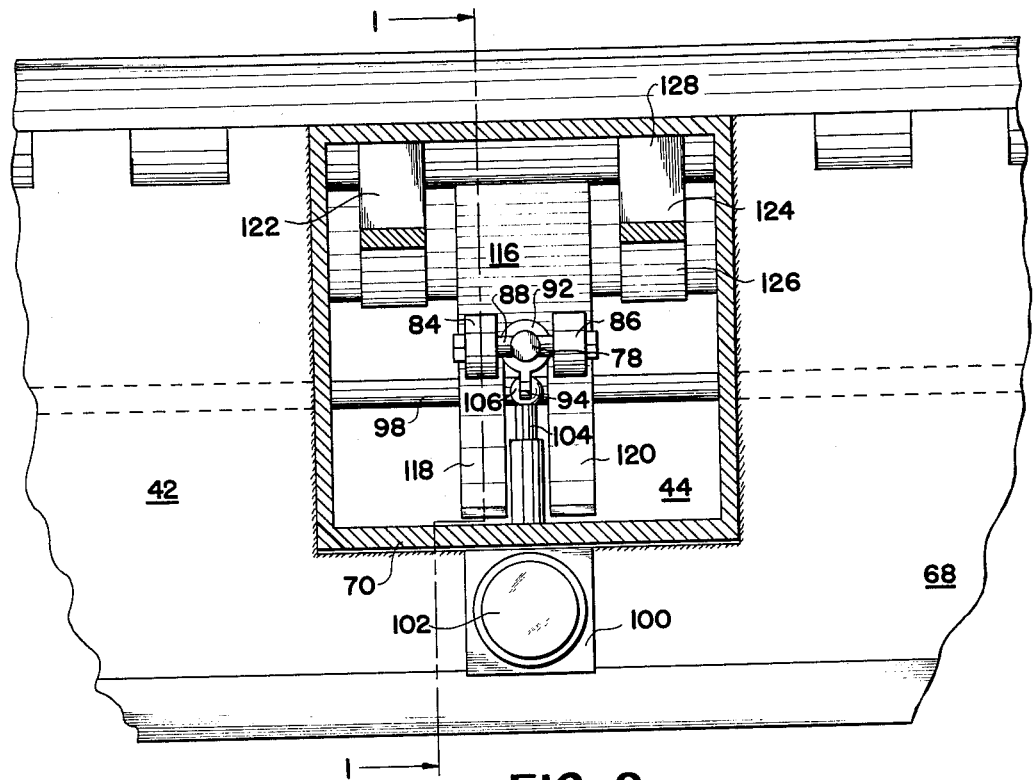
FIG. 2 is a cross section view taken along the line 2—2 of FIG. 1.

Referring now to FIGS. 1 and 2 of the drawings in detail, a preferred specific embodiment of the sample means of the invention is shown generally at 40 and includes suitable support means 42 for a cup or the like. The support means 42 can be conventional conveyor bucket or the like as shown at 30 in FIG. 3 which has been modified or is adapted to receive a sample cup or the like and the other structure associated therewith of the invention. Preferably, the cup support member 42 includes an inner wall 44 which is operatively connectible to the belt 28 in any suitable manner. As illustrated in the drawings mounting bolts 46 and 48 are provided which have the head end portions thereof positioned on the inner surface of the belt 28 with the shank portion thereof projecting through the belt and through upper and lower portions of the inner wall 44 of the cup support member 42. Washers or the like 50 and 52 receive the shank portion of bolt 46 and a coil or helical spring 54 is positioned between the washers 50 and 52 and surrounds the shank portion of bolt 46 and a common nut 56 is positioned on the shank portion 46 of the bolt and by tightening the nut the tension of spring 54 can be adjusted. In the same or similar manner the washers 58 and 60 are positioned on bolt 48 and are engaged by a helical spring 62 with the spring tension being adjusted by movement of the nut 64 on bolt 48. This preferred mounting of the cup support member 42 provides a desirable flexible or resilient mounting for the support member 42.

Projecting outwardly from the inner wall 44 of the support member 42 is a bottom wall 66 and secured thereto and projecting upwardly therefrom is an outer wall 68, the cup support member shown being a modified bucket for a conveyor or the like which has a hole 69 in the outer wall 68 and an adapter member is connected thereto and includes a wall 70 which may be considered as being a continuation of the bottom wall 66 and an outer wall 72 which may be considered as being a continuation or portion of the outer wall 68. The cup support member 42 serves to mount a sample receiving means and operating structure therefor as explained hereinafter and can be of any suitable construction, shape or materials, depending upon the application and materials available.

The inner wall 44 of cup support member 42 has a hole or opening 73 therethrough and an elongated generally cylindrical bearing sleeve 74 is secured by welding or the like to the inner surface of the inner wall 44 and projects outwardly therefrom and is positioned to be in register with the hole 73 in the inner wall 44. Likewise, a hole or opening 76 is provided in the belt 28 and is in register with the holes or openings in the inner wall 44 and the sleeve 74 and the hole or opening 76 can be of any suitable shape or size.

An elongated operating rod or member 78 is slidably mounted in the sleeve 74 and has one end portion thereof projecting through the hole 73 in the inner wall 44 of the cup support member 42 and into the hole 76 in the belt 28. Suitable anti-friction means, such as a roller, ball or the like are preferably provided and mounted on the projecting end portion of the rod 78 and a roller 80 is shown in the drawings mounted on a support or mounting member 82 which is connected to the end of the rod 78. The roller 80 is engageable with the head roller 16 in operation to cause retraction of the rod 78 into the cup support member 42 in a manner explained more fully hereinafter.

Arm engaging means are provided with rod 78. For this purpose a first pair of wheels 84 and 86 are rotatably mounted on a shaft 88 on rod 78 and the wheels are desirably positioned at the end portion of the rod opposite from the roller 80. The wheels 84 and 86 are preferably positioned on substantially diametrically opposite sides of the rod 78 and are coaxially mounted. A second pair of wheels is rotatably mounted on the rod 78 adjacent to and spaced from the first pair of rollers or wheels and one of the rollers 90 of the second pair of wheels is illustrated in FIG. 1, it being understood that the second pair of wheels is mounted in the same manner as the wheels 84 and 86.

Suitable rod stop means are preferably provided and connected to the rod 78 to limit travel thereof. A rod stop 92 is shown secured to the rod 78 adjacent the wheel 90 and the stop 92 preferably has a portion 94 which projects from the rod 78 and desirably projects toward the bottom 66 of the cup support member 42.

Means are provided to urge the rod 78 through the sleeve 74 toward the belt 28. Preferably, an elongated helical spring 96 is positioned around the rod 78 and is secured in its end portions to the rod stop 92 and to the sleeve 74 by welding or other suitable means. The spring 96 is of length and is mounted so that when in the position illustrated in FIG. 1 the spring is under tension when the rod 78 is retracted into the rod support member 42 to thereby continually urge the rod 78 through the sleeve 74 and the belt 28.

Means are preferably provided to limit travel of the rod 78 and in some instances the length of the spring 96 will be adequate to limit travel of the rod. If desired, a rod or the like 98 can be secured to the side walls of the cup support member 42 and positioned beneath the rod 78 and located to be engaged by the portion 94 of the rod stop 92 to thereby limit travel of the rod stop 92 and the rod 78. Engagement of the portion 94 of the rod stop 92 with the rod 98 is illustrated by the dashed lines in FIG. 1.

Means releasably engageable with the rod stop 92 are preferably provided to normally hold the rod in retracted position and to release the rod to permit movement of the rod. For this purpose, photo-electric cell operated solenoid means of any suitable or common construction are shown generally at 100 and includes a photo-electric cell having a light sensitive element 102 facing toward the side 24 of the housing and a solenoid rod 104 projects upwardly and has a rounded end portion 106 engageable with the portion 94 of the rod stop 92 and when in engagement therewith limits or prevents travel of the rod 78. A suitable light source 108 is mounted on side wall 24 of the housing preferably adjacent chute 22 and faces into the housing and light from the source 108 is directed to provide light to the light sensitive element 102 of the photo-cell when the sampling means moves past the light source to thereby cause an electrical signal to be provided to the solenoid portion 103 of the device and thereby cause retraction of the solenoid rod 104 in the usual manner. Retraction of the rod 104 disengages the portion 106 from the portion 94 of the rod stop 92 to permit travel of the rod 78 with the spring 96 causing travel of the rod and movement of the rod stop 92 from the position shown in the solid lines to the position shown in the dashed lines in FIG. 1. The rod 104 is extended by the usual spring means (not shown) associated with the solenoid in the usual manner.

Means for receiving conveyor moved materials is preferably movably mounted on the support means 42. For this purpose a sample cup or the like 110 is provided and preferably has an edge portion 112 thereof hingedly mounted on the upper edge portion of the outer wall 72 of the cup support member 42 and the opposite edge portion 114 of the cup 110 can be positioned to engage and rest on the upper edge portion of the inner wall 44 of the cup support member. Mounting bolt 46 is positioned to the side of the cup to be out of the interfering way of the cup during pivotal movement thereof. The side edges of the cup 110 can be inclined if desired, such as the 5 degree angle shown.

An elongated arm 116 is operatively connected in one end portion to the edge portion 112 of the cup 110 and the other end portion of the arm 116 is preferably slotted as best illustrated in FIG. 2 with the slotted end having a portion 118 positioned between the wheels 84 and 90 of the front and rear pair of wheels and another portion 120 of the arm 116 is positioned between the wheels on the other side of the rod 78. Preferably, the lower or slotted end portion of the arm 116 is curved toward wall 72 as best illustrated in FIG. 1 to provide desirable leverage for movement of the cup 110.

Means can be provided to urge the cup 110 from the position shown in the solid lines in FIG. 1 to the position shown in the dashed lines in FIG. 1. For this purpose, two symmetrically mounted leaf springs 122 and 124 are provided and are of like construction and are mounted on oposite sides of arm 116. Spring 124 has a portion 126 positioned in engagement with the lower surface of the cup 110 and has another portion 128 engageable with the wall 72 of the cup support member and the portions 126 and 128 of the leaf spring 124 are positioned to be in compression when the cup is in the position shown in the solid lines of FIG. 1.

In operation, the head roller 16 or boot roller 18 is driven by suitable power means (not shown) which causes movement of the belt 28 around the rollers and thus moves the buckets 30 and the support member 42 within the housing 10 of the conveyor. As the buckets and sample cup 110 are moved through the boot portion of the conveyor housing 10 they receive material, such as grain or the like, in the boot portion of the housing and thus move same upwardly along the left side of the housing shown at the left in FIG. 3. As the support member 42 and cup 110 are moved past the light source 108 on wall 24 adjacent the sample chute 22, light from the source 108 is directed onto the light sensitive element 102 of the photoelectric cell to provide an electric signal which causes retraction of the solenoid rod 104 to disengage the end portion 106 of the solenoid rod from the projecting portion 94 of the stop 92 connected to the rod 78.

With the rod stop 92 released from the solenoid rod 104, the helical spring 96 moves the rod 78 through the sleeve 74 and the hole 76 in the belt 28 and during movement thereof the wheels 84 and 86 mounted on rod 78 engage portions 118 and 120 of the arm 116 to cause pivotal movement of the cup 110 from the position shown in the solid lines to the position shown in the dashed lines in FIG. 1. Springs 122 and 124 aid in moving the cup 110 and the curvature of arm 116 provides desirable leverage for moving the cup. A sample of grain or other material contained in the cup 110 is discharged from the cup when it stops pivotal movement due to the inertia imparted to the material by movement of the cup and the material is received by the chute 22 connected to the side 24 of the housing 10. The angular movement of the cup 110 for discharge of material is variable, the 70 degree movement shown being satisfactory in a typical application. A suitable sack, bag or the like can be positioned around the lower portion of the chute 26 to receive the sample, if desired.

Figure 5:
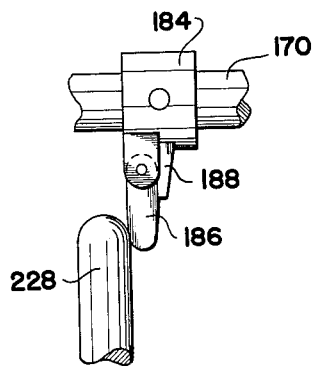
FIG. 5 is a view of a portion of the sampling means of FIG. 4 illustrating the construction of the rod stop means.

The weight of the cup 110 acts against the force of the spring 96 and can cause some retraction of the rod 78, however, the rod 78 remains extended for all practical purposes until such time as the anti-friction means or roller 80 engages the head roller 16 of the conveyor system. As belt 28 moves around the head roller 16 and the roller 80 engages the head roller 16, the rod 78 is forced from the extended position into the retracted position in the cup support member 42 and this action returns the rod 78 to the position illustrated in FIG. 1. The portion 94 of rod stop 92 is desirably provided with a rounded rear surface as illustrated in FIG. 1 so that a rounded surface thereof engaging the ball 106 on the end of rod 104 of the solenoid acts against the spring of the solenoid to retract the solenoid rod and permit movement of the rod stop 92 to the normal position shown in FIG. 1. If desired, portion 94 of stop 92 can be pivotally mounted as shown in FIG. 5. As the cup support member 42 is moved around the head roller 16 the cup 110 is returned to the position shown in the solid lines and retained in such position by the solenoid rod 104 until such time as the photosensitive element 102 receives light from the source 108 to cause retraction of the solenoid rod 104. Grain or other material contained in the buckets 30 is discharged through the outlet 12 of the housing 10 in the usual manner during passage of the buckets around the head roller 16.

The size and shape of the support member 42 and the cup 110 can be varied as desired by those skilled in the art for any particular application. Preferably, the cup support member 42 is substantially the same size and shape as the buckets 30 and the cup 110 is somewhat narrower than the width of the cup support member 42 so that grain or other materials will not only fill the cup 110 when passing through the boot portion of the conveyor but will also fill the cup support 42 and such results in a conveyor system that is balanced, that is, all of the buckets and the cup support members 42 weigh approximately the same. If it is desired that the cup support 42 not receive grain or other materials, then the cup 110 can be of size to completely cover the top thereof and/or the cup support member 42 can be provided with holes or openings at the bottom thereof for discharge of material received therein during passage through the boot portion of the conveyor housing 10.

Figure 4:
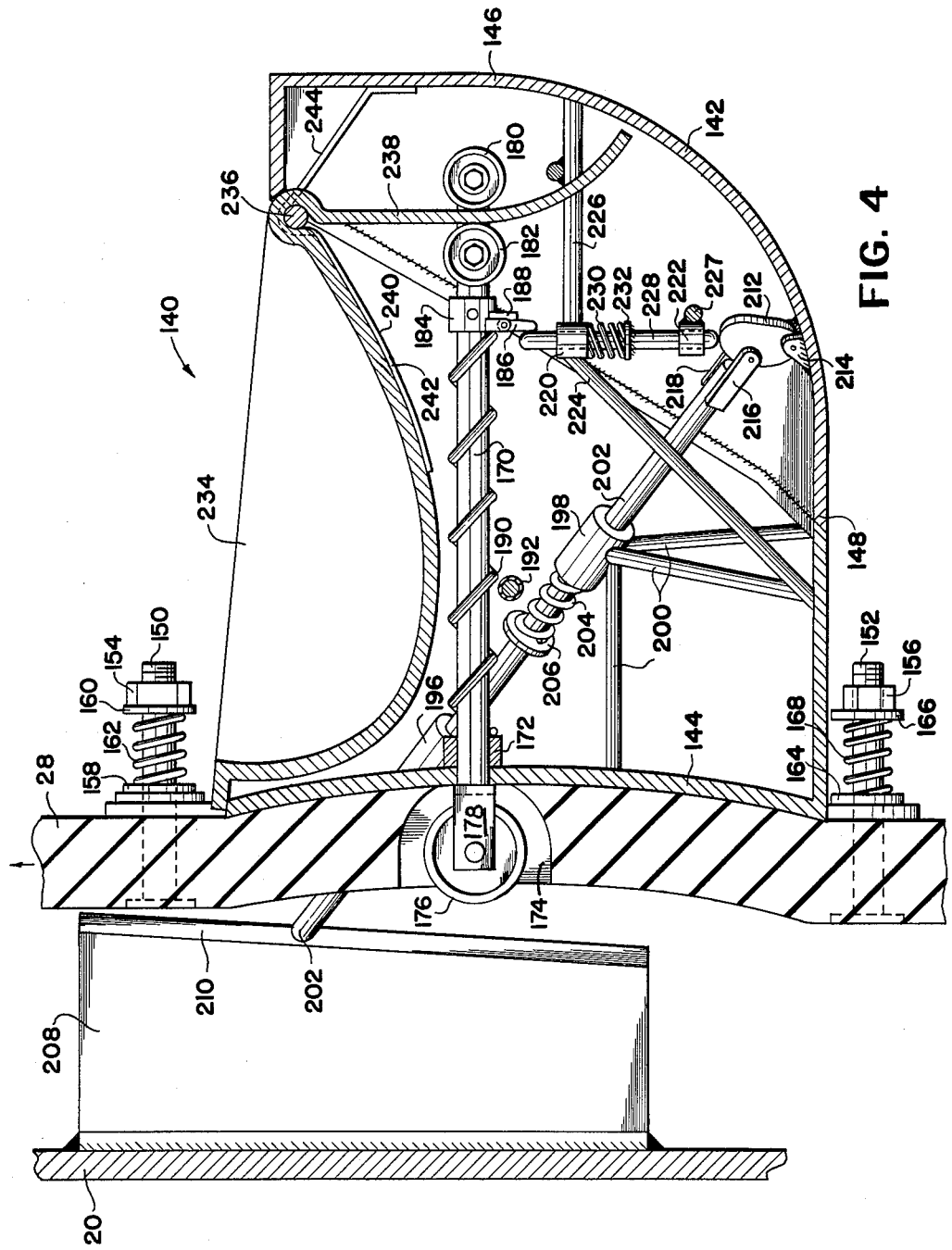
FIG. 4 is an enlarged cross section view illustrating another preferred specific embodiment of the means for sampling conveyor moved materials or the like of the invention.

FIGS. 4 and 5 of the drawings illustrate generally at 140 another preferred specific embodiment of the sampling means for materials of the invention. The sampling means 140 in FIGS. 4 and 5 is somewhat similar to the sampler 40 of FIGS. 1 and 2 except that mechanical means are utilized to release the rod and permit movement of the cup.

The sampler 140 includes a cup support member 142 having an inner wall 144, an outer wall 146 and a bottom wall 148 which is connected to the inner and outer walls. The cup support member 142 is preferably operatively connected to the conveyor belt 28 in any suitable manner, including the manner described hereinbefore in connection with FIG. 1. The connection of the cup support member 142 to the belt 28 as illustrated in FIG. 4 includes bolts 150 and 152 which pass through the belt 28 and receive nuts 154 and 156, respectively. Washers 158 and 160 are positioned on the shank portion of the bolt 150 and a spring 162 engages the washers to thereby resiliently or movably mount the upper portion of wall 144 on the belt 28. Likewise, washers 164 and 166 are positioned around the shank portion of bolt 152 and are engaged by a spring 168 to resiliently mount the bottom portion of the cup support member 142.

An elongated operating rod 170 has one end portion thereof projecting through a cylindrical bearing or sleeve 172 and through a hole or opening 173 in the inner wall 144 of cup support member 142 and into a hole or opening 174 in the belt 28. Suitable anti-friction means such as a roller 176 is preferably provided and mounted on roller mounting means 178 connected to the projecting end portion of the rod 170.

Wheels 180 and 182 are mounted on the other end portion of the rod 170 and such preferably are part of two pairs of wheels mounted on opposite sides of the rod in the manner shown and described hereinbefore in connection with FIGS. 1 and 2.

A rod stop 184 is provided and includes a portion secured to the rod 170 and an arm portion 186 which is pivotally mounted thereto and projects downwardly therefrom and such is movable from the position shown in the solid lines to the position shown in the dashed lines in FIG. 5. A flange or stop 188 is secured to the portion of the stop 184 connected to the rod 170 and limits rearward movement of the arm 186.

Spring means, such as the elongated helical spring shown at 190 is provided and positioned around the rod 170 and secured at the end portions thereof to the sleeve 172 and to the rod stop 184 and such is desirably normally under tension when the rod is in the position illustrated in FIG. 4 to thereby urge movement of the rod through the sleeve 172. A rod, bar or the like 192 can be provided and mounted on the cup support member 142 to engage the portion 186 of the rod stop and thus limit travel of the rod.

Two cylindrical bearing members 196 and 198 are preferably provided and are mounted within the cup support member 142 in any suitable manner, such as by mounting the member 196 directly onto the cup support member and by mounting the bearing member 198 on suitable supports or the like 200 connected to the cup support member and to the bearing member. The bearing members 196 and 198 are positioned in spaced relation as illustrated in FIG. 4 and are preferably axially aligned and the bearing member 196 is axially aligned with an opening or hole through the cup support member 142. An elongated shaft 202 is slidably positioned in the bearing members 196 and 198 and projects through the hole or opening in the cup support member 142 and has one end portion thereof positioned outside of the cup support member as illustrated in FIG. 4. A helical spring 204 surrounds the shaft 202 and is engageable with an end of bearing 198 and with a washer or annular member 206 connected to the shaft 202 and the spring 204 urges the shaft 202 out of the cup support member 142 through the bearing member 196. A suitable trip or actuating member 208 is provided and is mounted on the conveyor housing in any suitable position, such as on the inner portion 20 of the housing and such is desirably located near the sample chute 22 on side 24 of the conveyor housing. The trip 208 has a surface 210 which is preferably inclined as best illustrated in FIG. 4 and is positioned relative to the end portion of shaft 202 to be engaged by the shaft 202 during movement of belt 28 and cause movement of the shaft in opposition to the spring 204.

An elongated cam member 212 is pivotally mounted in one end portion on ears or supports 214 connected to the bottom wall 148 of the cup support member 142. Suitable linkage or connecting members 216 and 218 are connected in the end portions to the other end portion of the shaft 202 and to an intermediate portion of the cam 212 so that movement of the shaft 202 by engagement with the trip 208 causes pivotal movement of the cam 212.

Cylindrical bearing members 220 and 222 are positioned within and mounted on the cup support member 142 in any suitable manner, the member 220 shown being mounted by supports 224 and 226 and member 222 being shown mounted on support 227.

A second elongated shaft 228 is slidably positioned in the bearing members 222 and 224 and projects from the end portions thereof and one end portion of the shaft 228 engages and rests on the other end portion of the cam member 212 and the other end portion of the shaft 228 is positioned to be engaged by a side portion of the arm portion 186 of the rod stop 184 on the side thereof opposite from the flange 188 so that engagement between the shaft 228 and the arm member 186 of rod stop 184 prevents movement of the rod 170 in a direction to the left in FIG. 4. Means, such as a spring 230, is provided to urge movement of rod 228 toward the cam 212 and preferably spring 230 is provided and connected to the bearing member 220 and to a washer or annular member 232 connected to the shaft 228 so that rod 228 is continually urged toward the cam 212. When shaft 202 is engaged by trip 208 and moved inwardly, pivotal movement of cam 212 results and the rod 228 is then urged or moved downwardly by spring 230 to maintain contact with the surface of the cam 212 and this moves the other end portion of the rod 228 out of engagement with the portion 186 of the rod stop 184 to permit movement of rod 170 by the spring 190.

A sample cup or the like 234 is provided and pivotally mounted on a rod or the like 236 connected to the upper edge portion of the outer wall 146 of the cup support member 142 and the other edge portion thereof can rest on the upper edge portion of the inner wall 144 of the cup support member 142. An arm 238 is preferably connected to the cup 234 and projects downwardly therefrom and is desirably bifurcated or slotted in the manner of the arm 116 of FIG. 1 and the slotted or bifurcated portion is positioned between the rollers 180 and 182 so that movement of rod 170 in either direction causes movement of arm 238 and thus pivotal movement of the cup 234.

Movement of the cup 234 upwardly from the cup support member 142 can be facilitated by use of a leaf spring 240 having an arm portion 242 engaging the lower surface of the cup 234 and another arm portion 244 engageable with the outer wall 146 of the cup support member 142. Preferably, two leaf springs similar to the one shown at 240 are provided and mounted as illustrated in FIG. 2 for the leaf springs 122 and 124.

In operation, movement of the conveyor belt 28 during operation of the conveyor apparatus causes passage of the cup 234 and cup support member 142 through the boot portion of the conveyor housing so that the cup 234 can receive grain or other materials contained therein and as the cup support member 142 is moved upwardly and passes near the sample chute 22, the shaft or rod 202 engages portion 210 of trip 208 mounted on the conveyor housing 220 to thereby cause pivotal movement of the cam member 212 which permits downward movement of the shaft 228 to release the portion 186 of rod stop 184 and then spring 190 moves rod 170 from the right to the left as shown in FIG. 4 and wheel 180 on shaft 170 engages arm 238 connected to sample cup 234 to thereby cause pivotal movement of the cup 234 and discharge of a sample of grain or the like therein into the sample chute 22 for collection therefrom in any suitable manner.

When rod or shaft 202 is released from trip 208 by continued movement of the conveyor belt 28, the spring 204 returns shaft 202 to its normal position and raises cam 212 to an elevated position and such causes upward movement of shaft 228 against the force or pressure of spring 230. When the conveyor belt 228 moves the cup support member 142 around the head roller 16 of the conveyor apparatus, the roller or wheel 176 engages the head roller to retract the rod 170 into the support 142 and such causes pivotal movement of the arm 186 of the rod stop 184 as illustrated in the dashed lines in FIG. 5 and finally returns the arm to the right side of the shaft 228 and in engagement therewith as shown in FIG. 4 to thus retain shaft 170 in a retracted position in the cup support member 142. This movement of the shaft 170 also lowers cup 234 as a result of engagement of the wheel 182 with the arm 238 connected to the cup.

Another preferred specific embodiment of the sampler for grain or the like of the invention is shown generally at 250 in FIG. 6 and includes a cup support member 252 mounted on a conveyor belt or the like 28 by any suitable means, including the means previously described. A sample cup 254 or other suitable means for receiving a sample of material is connected to the cup support member 252, such as by pivotally connecting same to the upper edge portion of an outer wall of the cup support member as shown at 256. The edge portion of the cup 254 opposite from the pivotal mounting 256 is illustrated at 258 and can be positioned to rest on an upper edge portion of an inner wall 253 of the cup support member 252.

An elongated arm 260 is provided and has one end portion thereof secured to the inner surface of the cup member 254 and the other end portion thereof passes over the hinge mounting 256 and projects toward the side 24 of the conveyor housing 10 with the outermost end portion of the arm 260 being positioned in close relation to the inner surface of the wall 24 of the conveyor housing.

An elongated and preferably generally cylindrical sleeve or mounting member 262 is preferably provided and is mounted on wall 24 of the housing 10 and projects outwardly therefrom and preferably a set screw or the like 264 is threadedly mounted in the sleeve 262. An elongated rod 266 is slidably and adjustably mounted in the sleeve 262 and can be be fixedly positioned therein by adjustment of the set screw 264 into engagement with the rod 266. One end portion of the rod 266 projects into the conveyor housing 24 and a roller 268 is mounted on a shaft 270 on a mounting member 274 which is connected to the end portion of the shaft 266 within housing 10. If desired, a shallow recess or projection can be provided on side 24 of the housing as is illustrated at 25 and the sleeve 262 mounted thereon so that the roller 268 projects only a small distance into the housing 10. Shaft 266 is adjusted in sleeve 262 so that the roller 268 is positioned to be engaged by the projecting end portion of the arm 260 as the cup support member and cup pass thereby in operation with such causing pivotal movement of the cup 254 about the pivotal connection 256 thereof and discharge of a sample of grain or the like 275 within the cup and into the sample chute 22. The arm 260 is released from engagement with the roller 268 by continued movement of the belt 28 and the cup 254 will normally be returned to its rest position as illustrated in FIG. 6 by the force of gravity. In order to facilitate return of the cup 254 to the desired position within the cup support member 252, an elongated helical spring 276 can be provided and connected in its end portions to the cup 254 and to the inner wall 253 of the cup support member 252. Spring 276 also serves to retain cup 254 in support 252 when the cup and support are inverted during downward movement thereof.

The sampling means of FIG. 6 can be utilized to obtain a sample of grain or the like during each complete revolution of the belt 28 around the head and boot rollers. If only periodic sampling is desired, then set screw 264 can be loosened and shaft 266 moved to a position so that the roller 268 can be out of the way of the end portion of arm 260 and no sample will then be taken by the apparatus until such time as the shaft 266 is moved into the sleeve 266 to move the roller 268 to the position in housing 10 to be engaged by the arm 260.

Another preferred specific embodiment of a sampling means for grain and other materials of the invention is illustrated generally at 280 in FIG. 7 of the drawings and includes a cup support member 282 including an inner wall 284, an outer wall 286 and a bottom wall or the like 288 connected to the inner wall and outer wall. The inner wall 284 is preferably operatively connected to the belt 28 of a conveyor system or the like by the use of suitable mounting means shown generally at 290 and 292 which can be the same or similar to the mounting means shown and described hereinbefore in connection with other embodiments of the invention. A battery 294 of any suitable construction is preferably mounted on the cup support member 282, such as on the bottom wall 288 thereof and provides a source of electric current for operation of a photo-electric cell actuated device as explained herein. A photo-electric cell 296 is mounted on the outer wall 286 of the cup support member 282 and has a light sensitive element 298 directed toward a wall 24 of the conveyor housing and such is positioned to receive a beam of light from a light source 108 mounted on the conveyor housing adjacent a sample chute or the like 22 as illustrated in FIG. 3. The cell 296 is operatively connected to the battery 294 and to a common relay 300 which can be mounted on the cup support member 282 in any suitable manner.

A solenoid 302 having a solenoid rod 304 is pivotally mounted by an ear or flange 306 to the cup support member 282 and is electrically connected to relay 300 to receive electric current therefrom in response to operation of the photo-electric cell 296 with such causing retraction of the rod 304 into the solenoid 302, the rod moving in operation from the bottom upwardly into the body portion of the solenoid.

Means for receiving the sample of material, such as a sample cup 308, is provided and is pivotally or hingedly mounted at 310 to the upper edge portion of the outer wall 286 in the cup support member 282. The cup 308 has an ear or flange 312 connected to the bottom surface thereof and the solenoid rod 304 is pivotally connected to the ear or flange 312 so that when an electrical signal is received by the solenoid 302 the rod 304 moves upwardly to cause pivotal movement of the sample cup 308 to move same from the position shown in the solid lines to the position shown in the dashed lines. When the conveyor belt 28 moves the photo-electric cell 296 out of the beam of light from the light source 108, the rod 304 of the solenoid 302 is moved downwardly as a result of operation of the solenoid to cause return of the cup 302 to the position shown in the solid lines in FIG. 7.

Use of a photo-electric cell or light actuated means for controlling operation of the sample cup as illustrated and described in connection with FIGS. 1 and 7 is quite desirable since a sample can then be selectively taken at any desired time or place or at a desired interval of time with the cup remaining in position in the cup support member during normal operation of the conveyor apparatus. Also, use of a light source as the actuating means for the apparatus results in a minimum amount of modification of the conveyor housing which is also desirable.

In embodiments of the invention where solenoid operated means are utilized for releasing of an operating rod or for direct movement of the sample cup, other remote control actuating apparatus can be provided to cause retraction of the solenoid rod. An example of such apparatus is illustrated diagrammatically in FIG. 8 of the drawings in which a solenoid 320 having a solenoid rod 322 projecting therefrom is provided and is mounted on a cup support member or the like. As illustrated in the drawings, the rod 322 is engageable with a portion 324 of a rod stop 326 mounted on a rod 328 which can be the same or similar construction to the rod 78 of FIG. 1 or the solenoid rod 322 can be directly connected to the sample cup or the like as illustrated in FIG. 7. If desired, portion 324 can be mounted as shown in FIG. 5. In either instance, retraction of rod 322 results in movement of a sample cup or the like.

A battery 330 is mounted on the cup support member or the like and is electrically connected to the solenoid 320. Suitable radio receiver operated switch means 332 is provided and is connected in the electrical circuit between battery 330 and the solenoid 320 and is operable when receiving electrical signals to close the switch means and complete the circuit from the battery to the solenoid and thereby cause retraction of the solenoid rod 322.

In order to actuate the receiver operated switch means 332, a radio transmitter or the like 334 of any suitable construction can be provided and has a key or the like 336 thereon for operation thereof to transmit a signal from the antenna 338. The key 336 is depressed by an individual or worker who is positioned adjacent the wall 24 of the conveyor housing and can view the conveyor buckets and sample cup through a window 340 in the wall 24 so that the switch means 332 can be closed and solenoid 320 actuated to cause pivotal movement of a cup or the like at the desired time for discharge of the sample grain or other material into the chute 22.

The sampling means of the invention can be used for sampling grain and other suitable materials which are movable by conveyor means. Materials which can be sampled include flour or other grain products, cement, sand, and other like materials used in construction and industry, coal or other mined products, and other products or materials which can be received in a sample cup or similar structure mountable on a conveyor belt or the like.

While the invention has been described in connection with preferred specific embodiments thereof, it will be

I claim:

1. A sampler for grain and the like comprising, in combination, a conveyor housing having an outlet at an upper portion thereof and an inlet at a lower portion thereof, a head roller rotatably mounted in said upper portion of said housing, a boot roller rotatably mounted in said lower portion of said housing, a sample chute connected to a side of said housing and having an upper portion opening into said housing, an endless belt extending between and positioned on said head roller and said boot roller and movable therewith in operation, a plurality of buckets for grain or the like connected to said belt with said buckets being moved during movement of said belt from the boot portion of said housing upwardly around said head roller and returned to said boot portion of said housing to thereby receive and move grain or the like when positioned in said boot of said housing, a sample cup support member connected to said belt and positioned between two of said buckets, an elongated operating rod slidably mounted in said cup support member and through said belt, a roller rotatably mounted on said one end portion of said rod and engageable with said head roller and said boot roller in operation to cause retraction of said rod into said cup support member, a first pair of wheels rotatably mounted on the other end portion of said rod, a second pair of wheels rotatably mounted on said rod adjacent to and spaced from said first pair of wheels, a rod stop secured to said rod adjacent said second pair of wheels with said rod stop having a portion thereof projecting therefrom toward said bottom of said cup support member, a helical spring surrounding said rod with said spring being under tension when said rod is at its innermost position in said cup support member to thereby urge said rod outwardly therefrom, a photo-electric cell operated solenoid mounted on said bottom of said cup support member and including a photo-electric cell facing said conveyor housing and a solenoid rod projecting upwardly and having an upper end portion positioned when extended immediately beneath said rod and engageable by said portion of said rod stop projecting toward said bottom of said cup support member with said solenoid rod in operation being retractable to a position to permit said rod stop to move so that said spring can move said rod through said inner wall of said cup support member and said belt, a light source mounted on said conveyor housing adjacent said sample chute and positioned to direct a beam of light onto said photo-electric cell to operate same and cause retraction of said solenoid rod, a sample cup having one edge portion pivotally mounted on the upper end portion of the outer wall of said cup support member, and an elongated arm operatively connected in one end portion to said one side portion of said cup with the other end portion of said arm being slotted and received between said first pair of wheels and said second pair of wheels on said rod, said sampler for grain and the like being constructed and adapted so that rotation of said head and boot rollers causes movement of said belt and said buckets and said cup through the boot portion of said housing to receive grain or the like in said buckets and said cup with said photo-electric cell being activated by a beam of light from said light source to cause retraction of said solenoid rod and thereby permit said rod to move with said wheels engaging said arm to thereby cause pivotal movement of said cup and discharge of a grain sample therein into said sample chute, said roller on said one end portion of said rod engaging said head roller when passing therearound to thereby retract said rod and place said helical spring under tension and move said rod stop past said solenoid rod and with said second pair of roller wheels engaging said arm to cause lowering of said sample cup during retraction of said rod.

2. A sampler for grain and the like comprising, in combination, a conveyor housing having an outlet at an upper portion thereof and an inlet at the lower portion thereof, a head roller rotatably mounted in said upper portion of said housing and a boot roller rotatably mounted in said lower portion of said housing, a sample chute connected to a side of said housing and having a portion opening into said housing, belt means mounted on said head roller and said boot roller and movable therewith in operation, a sample cup support member mounted on said belt and movable therewith, an elongated operating rod slidably positioned in said cup support member and having one end portion projecting therefrom, roller means mounted on said one end portion of said rod and engageable with said head roller in operation to cause retraction of said rod into said cup support member, wheel means mounted on the other end portion of said rod, spring means operatively connected to said rod to urge said rod outwardly from said cup support member, means operatively connected to said cup support member and engageable with said operating rod to prevent travel thereof, means operatively connected to said last-named means to cause movement thereof to permit movement of said operating rod, a sample cup having one edge portion pivotally mounted on an upper portion of said cup support member, arm means operatively connected to said cup and engageable by said wheel means on said operating rod so that movement of said operating rod causes pivotal movement of said cup, said sampler for grain and the like being constructed and adapted so that movement of said head and boot rollers causes movement of said belt and said sample cup support member and said cup through said boot portion of said housing to receive grain or the like in said cup with movement of said operating rod causing pivotal movement of said cup and discharge a sample of grain or the like contained therein into said sample chute.

3. Means for obtaining a sample of grain or the like comprising, in combination, a sample cup support member having an inner wall mounted on a conveyor belt or the like for movement therewith, said sample cup support member having an outer side wall positioned in spaced relation to an inner side wall and having a bottom wall connecting said side walls, an elongated operating rod having one end portion thereof projecting through a hole in said inner wall of said cup support member, means operatively connected to said cup support member and releasably engageable with said rod to permit movement of said rod, a sample cup movably mounted on said cup support member, arm means operatively connected to said sample cup, means on said rod engageable with said arm means so that movement of said rod causes movement of said sample cup for discharge of a grain sample or the like therein, said means for obtaining a sample of grain or the like being constructed and adapted so that said cup support member can be mounted on a belt or the like of a conveyor system so that said cup can be filled with grain or the like and with said rod being releasable to cause movement of said cup and discharge of a sample of grain or the like therein.

4. A sampler for grain and the like comprising, in combination, a conveyor housing having an outlet at an upper portion thereof and an inlet at a lower portion thereof, a head roller rotatably mounted in said upper portion of said housing, a boot roller rotatably mounted in said lower portion of said housing, a sample chute connected to a side of said housing and having an upper portion opening into said housing, an endless belt extending between and positioned on said head roller and said boot roller and movable therewith in operation, a plurality of buckets for grain or the like connected to said belt with said buckets being moved during movement of said belt from the boot portion of said housing upwardly around said head roller and returned to said boot portion of said housing to thereby receive and move grain or the like when positioned in said boot of said housing, a sample cup support member connected to said belt and positioned between two of said buckets, an elongated operating rod slidably mounted in said cup support member and through said belt, a roller rotatably mounted on said one end portion of said rod and engageable with said head roller and said boot roller in operation to cause retraction of said rod into said cup support member, a first pair of wheels rotatably mounted on the other end portion of said rod, a second pair of wheels rotatably mounted on said rod adjacent to and spaced from said first pair of roller wheels, a rod stop secured to said rod adjacent said second pair of wheels with said rod stop having a hingedly mounted portion projecting toward said bottom of said cup support member, a helical spring surrounding said rod with said spring being under tension when said rod is at its innermost position in said cup support member to thereby urge said rod outwardly therefrom, an elongated shaft slidably positioned in said cup support member and projecting therefrom, a second helical spring surrounding said shaft and operable to urge said shaft outwardly, a trip mounted on said conveyor housing adjacent said chute and positioned to engage an outer end portion of said shaft to cause movement thereof into said cup support, a cam pivotally mounted in one end portion on said bottom of said cup support member, linkage connecting the other end portion of said shaft to an intermediate portion of said cam so that movement of said shaft causes movement of said cam, a second shaft slidably positioned with one end portion of said shaft engaging said other end portion of said cam and with the other end portion of said shaft being positionable in contact with said portion of said rod stop projecting toward said bottom of said cup support, spring means operatively connected to said second shaft to urge said second shaft toward said cam, a sample cup having one edge portion thereof pivotally mounted on the upper end portion of the outer wall of said cup support member, and an elongated arm operatively connected in one end portion to said one side portion of said cup with the other end portion of said arm being slotted and received between said first pair of wheels and said second pair of wheels on said rod, said sampler for grain or the like being constructed and adapted so that rotation of said head and boot rollers causes movement of said belt and said buckets and said cup through the boot portion of said housing to receive grain or the like in said buckets and said cup with said first shaft being moved by said trip on said housing to cause movement of said cam and permit downward movement of said second shaft to thereby disengage said second shaft from said rod stop and permit said first helical spring to move said control rod with said first pair of wheels engaging said arm on said cup to cause upward movement of said cup and thereby discharge grain in said cup into said sample chute, said first shaft being extended by said second helical spring when disengaged from said trip to cause movement of said cam to thereby move said second shaft upwardly, said roller on said control rod engaging said head roller to retract said control rod and return said cup to said cup support member.

5. Means for sampling grain or the like comprising, in combination, a conveyor belt, a sample cup support member having an inner wall mounted on said conveyor belt and an outer wall positioned in spaced relation to said inner wall and connected thereto by a bottom wall, an elongated operating rod slidably mounted in said inner wall and having one end portion thereof projecting through said inner wall of said cup support member, anti-friction means mounted on said one end portion of said rod, spring means operatively connected to said rod to urge said other end portion of said rod toward said inner wall of said cup support member, rod stop means connected to said rod and having a portion thereof projecting therefrom, cam means movably connected to said bottom wall of said cup support member, a first shaft having one end portion operatively connected to said cam with the other end portion thereof projecting through said inner wall of said cup support member with movement of said shaft causing movement of said cam, a second shaft having one end portion thereof engageable by said cam with the other end portion thereof being engageable with said projecting portion of said rod stop with said second shaft being movable out of engagement with said rod stop during movement of said first shaft, and a sample cup pivotally mounted on said outer wall of said cup support member, arm means connected to said cup and projecting therefrom, means connected to said rod and engageable with said arm means during movement of said other end portion of said rod toward said inner wall of said cup support member to thereby cause pivotal movement of said sample cup, said means for sampling grain or the like being constructed and adapted so that said inner wall of said cup support member is mounted on said conveyor belt with said cup support member and said cup being movable by said belt through grain or other material to be sampled with a portion of the material being deposited in said cup and with said first shaft being movable to disengage said second shaft from said rod stop to thereby permit movement of said operating rod through said inner wall of said cup support member and thereby cause pivotal movement of said cup to discharge a sample of grain or the like therefrom, said anti-friction means on said operating rod being engageable with a head roller or the like to cause retraction of said operating rod into said cup support member and lowering of said sample cup.

6. Means for sampling grain or the like comprising, in combination, endless conveyor means, cup support means mounted on said conveyor means to move therewith, a sample cup movably mounted on said cup support means, operating means operatively connected to said cup and to said cup support means and movable relative thereto to cause movement of said cup for discharge of grain or the like therein, means operatively connected to said operating means to prevent movement thereof, and release means operatively connected to said last-named means operable to release said last-named means and permit movement of said operating means.

References Cited by the Examiner
UNITED STATES PATENTS 2,270,511    1/1942    Crain _____ 73—421
2,404,373    7/1946    Harlow _____ 73—421

RICHARD C. QUEISSER, *Primary Examiner.*

DAVID SCHONBERG, *Examiner.*